Patented Aug. 9, 1932

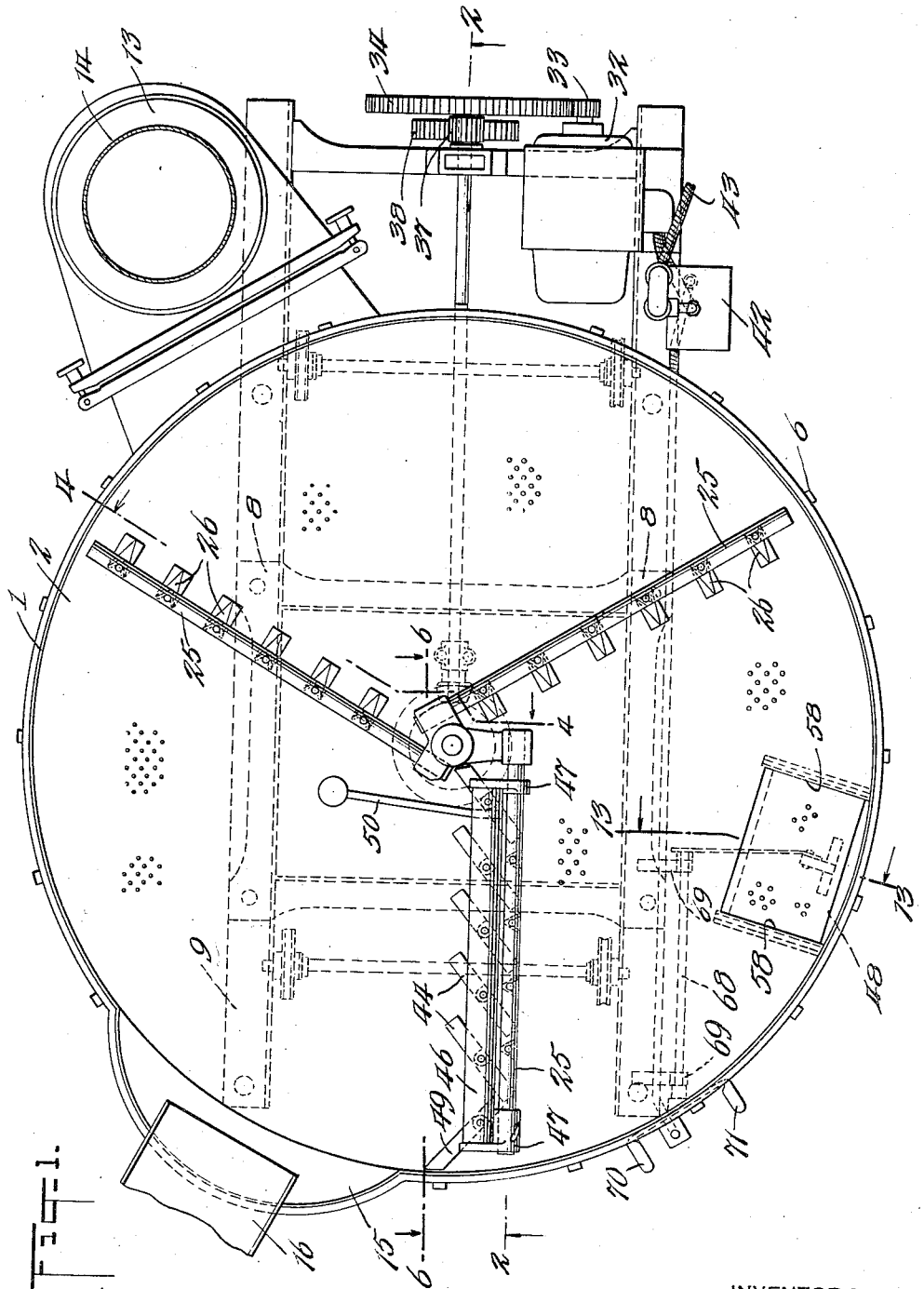

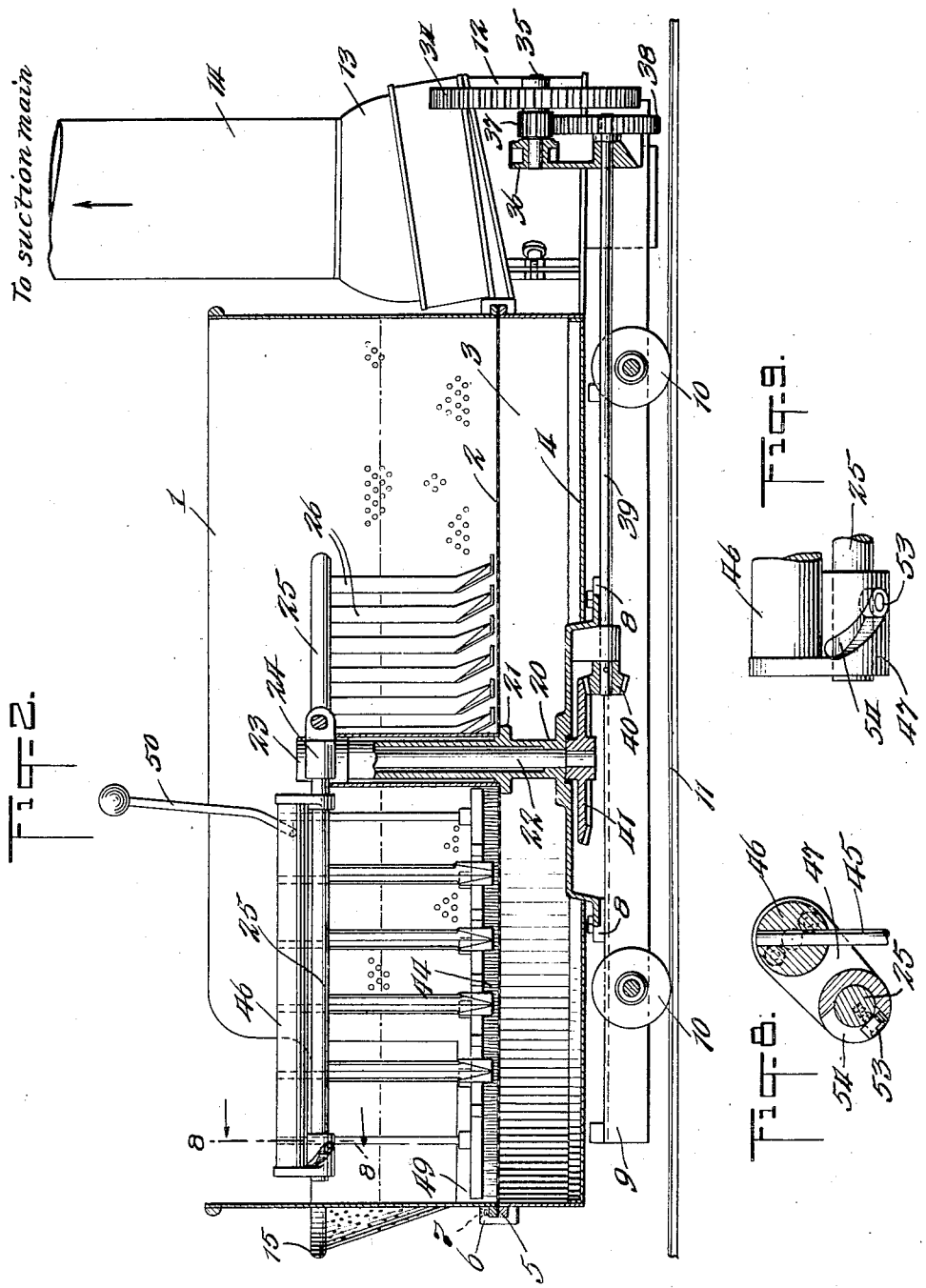

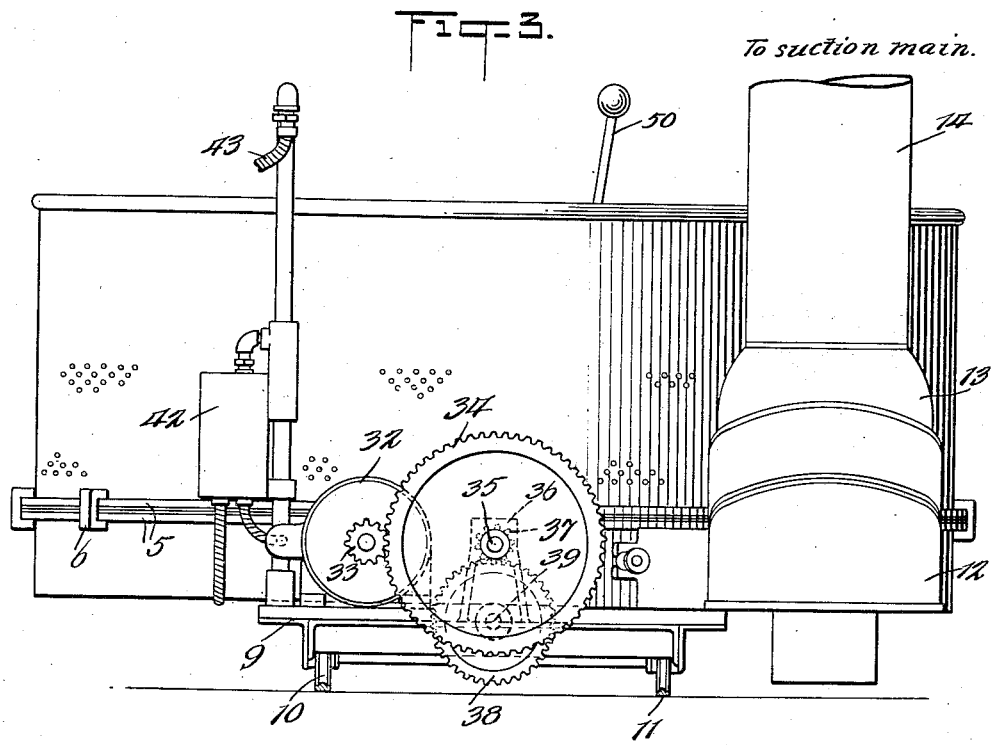
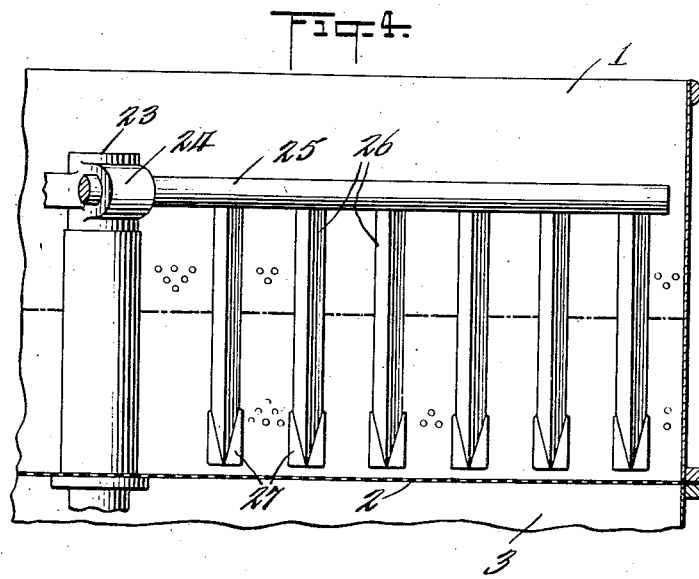
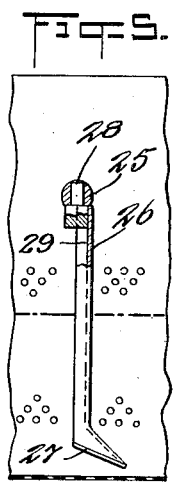

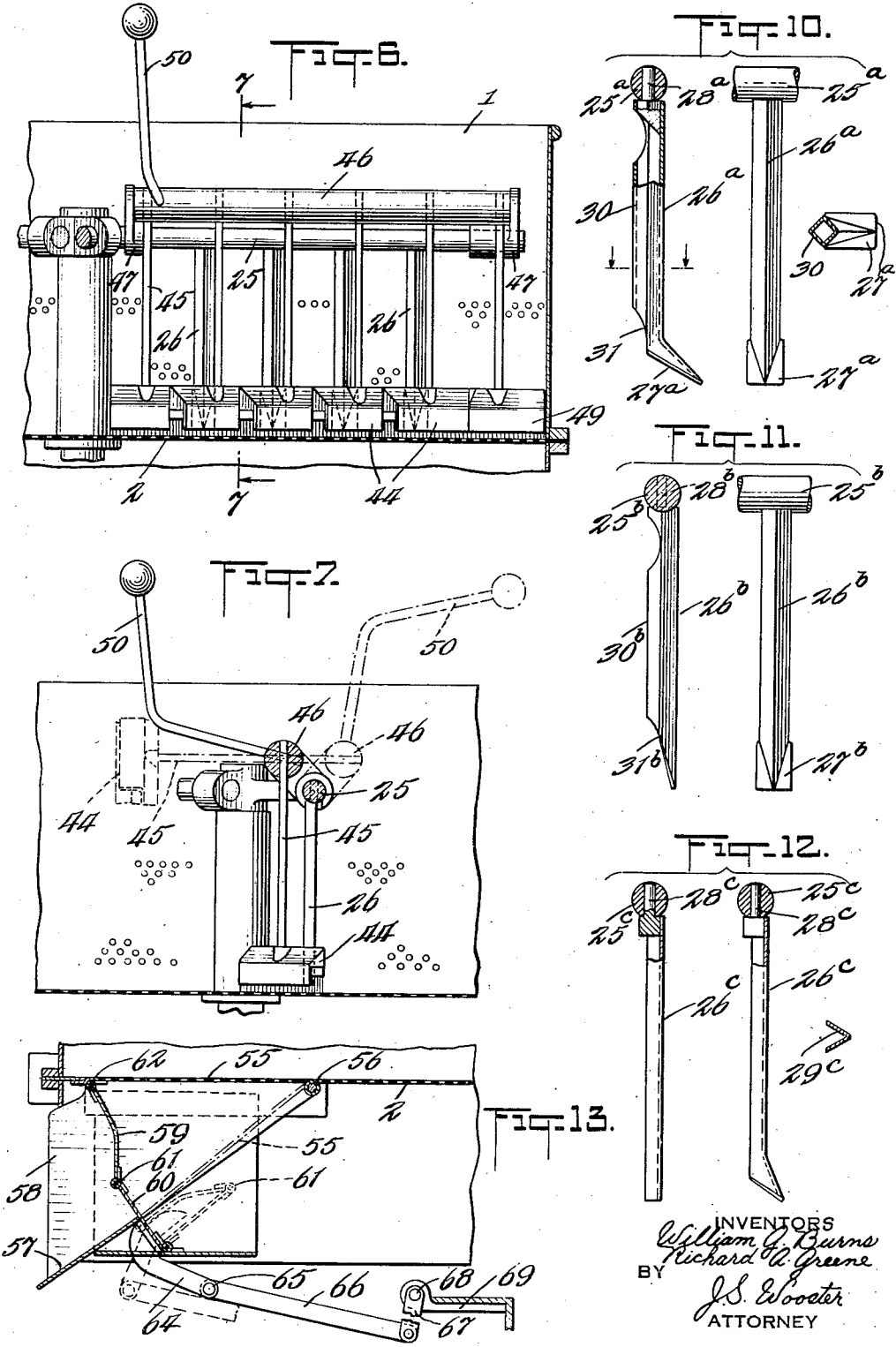

1,870,355

UNITED STATES PATENT OFFICE

WILLIAM G. BURNS, OF NEW YORK, AND RICHARD A. GREENE, OF BROOKLYN, NEW YORK, ASSIGNORS TO JABEZ BURNS & SONS, INC., OF NEW YORK, N. Y., A CORPORATION OF NEW YORK

APPARATUS FOR COOLING COFFEE, ETC.

Application filed August 23, 1929. Serial No. 387,840.

This invention relates to apparatus for cooling coffee or other materials, which are first heated or roasted to a certain degree, and then require rapid cooling to prevent further chemical change.

The invention is not only applicable to the roasting of coffee, but also to the treatment of various other materials, such as roasted cocoa beans, peanuts or cereals, and even products not intended for foods, wherever rapid cooling is desired to stop or control the action of heat on the material.

The object of the invention is to cool such materials more thoroughly and uniformly than heretofore, to provide a novel arrangement of stirrers for agitating the material to be cooled while continuously aiding the distribution of air through the mass, and to provide improved means for quickly emptying the device when the cooling operation is completed.

It is the aim of all roasters of coffee to turn out a product as nearly uniform as possible in appearance and quality. At the moment when the goods are fully roasted they are extremely hot, and unless quickly cooled they will continue roasting and consequently darken in color and change their characteristics such as their flavor, uniformity, etc. It is therefore customary to place the roasted coffee in a cooler box or car having a perforated bottom and a suction box below the bottom connected to an exhaust main. The car is usually mounted on wheels, so that it can be moved away from the roaster while the coffee is being cooled by the exhaust, and the car is then emptied and brought back to the roaster for another charge.

The difficulty with previous coolers of this type has been that they do not cool the coffee uniformly. The air which is drawn downwardly through the mass of beans cools the upper layers quickly, but in doing so it becomes heated and prolongs the time required to cool the beans in the lower strata. As a result, the parts which remain heated continue to roast and are darker in appearance than the parts that have cooled promptly. For this reason it is customary to stir the beans either manually, as by means of shovels, or mechanically, by means of rotatable rods or paddles, in order to expose all parts of the charge to the cool air. Mechanical stirring has been ineffective because the beans immediately fall back into the spaces formed in the wake of the stirrers, so that the cool air does not directly reach the beans in the lower strata. With manual stirring, no matter how vigorous, uniform cooling does not take place because the operator is constantly changing the level and depth of the mass and since the air goes through the thin portions rapidly and the thicker portions more slowly, the former cool quickly and the later remain heated.

The present invention largely overcomes previous difficulties by providing a novel construction and arrangement of rotatable stirrers which continuously lift the beans off the bottom of the cooler car, where they tend to remain hot, and also provide air spaces back of each stirrer which allow cooling streams of air to ventilate to a considerable distance below the upper strata of coffee as the stirrers advance through the mass of beans. The streams of cool air which are thus continuously drawn down into intermediate portions of the mass dilute the already hot air stream and cool it. The air streams thus have the same effect as though the mass of coffee were spread out in a thin layer of much greater area.

Another feature of the invention resides in the novel means employed to empty the cooler car quickly after the cooling operation is completed. This consists of a rotatable arm carrying a plurality of brushes which, during the cooling operation, are adapted to be raised out of the path of the beans, and at the end of the cooling operation may be lowered into the cooler car to propel the beans into a discharge opening in the bottom. A novel adjustment is provided whereby the outermost brush may be lowered into a position closely adjacent the vertical side of the cooler car so that it will sweep the outer edge where the beans would otherwise tend to collect, and when raised the brushes are automatically moved horizontally as well as vertically, to enable the outermost brush to clear the vertical side of the cooler car. We also provide a novel form of discharge door in the bottom, so constructed that when closed it effectively shuts off the suction box from the outside air and enables air to be drawn uniformly through the perforated bottom. This door may be opened instantly when it is desired to empty the cooler car.

In carrying out the invention, various novel combinations and sub-combinations in the cooling, stirring and discharging mechanisms have been used, all of which will be described in detail in connection with the accompanying drawings in which similar reference characters designate corresponding parts in the several views, and in which:

Fig. 1 is a plan view of a cooler car embodying the invention;

Fig. 2 is a vertical section taken on line 2—2 of Fig. 1;

Fig. 3 is an end elevation showing the driving mechanisms;

Fig. 4 is a vertical section taken on the line 4—4 of Fig. 1 showing the stirrers;

Fig. 5 is a fragmentary side view, partly in section, showing the mounting of the stirrers of Fig 4;

Fig. 6 is a vertical section taken on the line 6—6 of Fig. 1, showing the adjustable series of brushes for completely discharging the material;

Fig. 7 is a sectional view taken on the line 7—7 of Fig. 6, illustrating the adjustment of the brushes;

Fig. 8 is a detail sectional view taken on the line 8—8 of Fig. 2;

Fig. 9 is a detail view showing the mechanism for sliding the brush-carrying arm horizontally during vertical adjustment;

Figs. 10, 11 and 12 are detailed views, partly in section, showing several different forms of stirrers; and Fig. 13 is a vertical section taken on the line 13—13 of Fig. 1, showing the mechanism for controlling the adjustable discharge door in the bottom of the cooler car.

In Figs. 1 to 3 the cooler car of circular form is shown comprising a side 1, a perforated bottom or plate 2, and a lower suction box 3 having a bottom 4. The upper portion is preferably made independent of the suction box 3. The latter has the perforated plate 2 attached to it. These upper and lower portions are provided with adjacent peripheral flanges 5 and may be held in proper relation to each other by means of clamps 6. These clamps have set screws 7 which are set down hard against the upper flange 5, clamping the parts rigidly together. By loosening the set screws 7 in the clamps the upper part of the car can be rotated with respect to the suction box and it can be set in its proper position to receive goods from the roaster discharge spout.

The side of the cooler car is preferably perforated to permit some fresh air to be drawn directly into the lower strata of the material to be cooled, and thereby aid in effecting more uniform cooling than is obtained when the air is drawn only through the top. These perforations, as well as the perforations in the bottom 2, are of such size as to allow passage of air without passage of the coffee beans or other material being cooled.

The cooler car carries trunnions 8 mounted on a truck frame 9 having wheels 10 which travel on rails 11. If the cooler car is not to run on rails the wheels 10 may be replaced by casters, which will swivel according to the well known practice as the car is moved. These casters are not illustrated as their use and arrangement will be obvious.

The suction box 3 extends through the side of the cooler car and ends in an upwardly turned and enlarged tube 12, having a curved surface with which it engages a ball tube 13 which is attached to an upwardly extending straight tube 14. The straight tube 14 leads to a suction main or exhaust pipe and is preferably coupled thereto by means of a telescoping connection of the type disclosed in Patent 1,218,997 to R. A. Greene, issued March 13, 1917. In this way the cooler car may be moved freely between the roaster, where it receives a charge of hot beans, and the discharge point, without disconnecting it from the exhauster or interrupting the cooling operation. To permit the cooler car to be filled, a portion of the upper edge of the side is cut away and formed to provide a projecting lip 15 which is adapted to fit underneath the discharge door 16 of a roaster, as shown in Fig. 1.

The cooling cylinder is provided with a central hollow shaft 20 having a flange 21 which supports the bottom 2. A driving shaft 22 is rotatably mounted inside the hollow shaft 20, and has fixed to the top thereof a cap 23 having radial extensions 24 here shown to be three in number. The extensions 24 each support an elongated arm 25 parallel with the perforated bottom and extending outwardly almost to the side, as shown in Fig. 1. These arms each support a series of vertical parallel stirrers 26 which reach down almost to the bottom 2, but do not touch it.

In the form illustrated in Figs. 1 to 5 the stirrers 26 comprise elongated strips of metal of V-shaped cross-section having their lower ends terminating in transversely flat edges 27 inclined downwardly toward the bottom 2. The stirrers 26 are adjustably secured to the arms 25. The shaft 22 carrying arms 25 and stirrers 26 is rotated in a clockwise direction, as viewed in Fig. 1, and it will be seen that the forward pointed edges of the stirrers 26 plow through the beans and turn them over while the inclined flat edges 27 lift the beans off the screen 2. In this manner the lower strata of beans, especially the bottom layer, are constantly being changed and shifted toward the top into the region of cooler air. It will also be seen that the back of each V-shaped stirrer 26 consists of a trough or hollow channel 29 open to the air above the surface of the material. In advancing through the mass of coffee the stirrers 26 push the coffee to one side and in the short space of time that is required for the coffee to slide down into the space left by such stirrer a current of air is drawn into the channel 29 and part way through the mass of beans. The main stream of air which is drawn through the upper stratum of coffee has become heated by contact with the beans, and the addition of cool air at a point between the upper and lower layers dilutes the already heated air stream and cools it. The point at which the air is drawn behind the V-shaped stirrers depends upon the shape of the stirrers and their speed of rotation. The two air streams have the same effect as though the mass of coffee were spread out in a thin layer of much greater area.

Figs. 10 to 12 show several different forms of stirrers, in which the parts previously described bear similar reference numerals followed by the letters a, b or c, respectively, to distinguish the different views. The form shown in Fig. 10 is similar to that shown in Figs. 1 to 5, except that air channel at the rear is partially enclosed by a hollow section 30, and has the lower portion cut away at 31 so that air is drawn down through the hollow section to the lower stratum of coffee and passes down through it. In Fig. 11 the construction is the same as in Fig. 10, except that the lower end of the stirrer including the flat edge 27b is straight instead of being inclined. The middle view in Fig. 12 is the same as that shown in Figs. 1 to 5, while the left-hand view shows a modified construction in which the tapering and flattening at the lower end is omitted. Both forms are V-shaped in cross-section, having the rear hollow channel 29c.

The stirring mechanism is driven by an electric motor 32 having a pinion 33 which meshes with a gear wheel 34 carried by a stub shaft 35 mounted on a bracket 36. The stub shaft 35 also carries a pinion 37 which meshes with a gear wheel 38 carried by the shaft 39. At its opposite end the shaft 39 carries a beveled pinion 40 which meshes with a beveled gear 41 secured to the lower end of the shaft 22. The motor is provided with a starter 42 and with electric conductors preferably enclosed in a flexible cable 43, permitting the cooler car to be moved freely from one position to another without disconnecting the electric circuit.

The apparatus for rapidly emptying the cooling cylinder is best shown in Figs. 6 to 9, and consists of a plurality of flat parallel brushes 44 mounted on rods 45 which have their upper ends secured to an arm 46 parallel to and carried by one of the radial arms 25. Collars 47 are secured to the ends of the arm 46 and are slidably mounted on said radial arm 25, enabling the arm 46 to pivot upon the arm 25 and also to slide longitudinally thereof for a limited distance, as will be more fully described below.

The brushes 44 are preferably disposed at an angle of about 45° to the arm 46, as shown in Fig. 1, so that in sweeping over the bottom 2 they will brush the coffee beans toward the outer edge and into a discharge opening 48 in the bottom 2. In addition to the brushes 44 there is also provided a brush 49 at the outer end of the arm 46, which is preferably mounted at an angle of about 90° to the adjacent brush 44 and scrapes the outer edge of the cooler car. The brush 49 and the adjacent brush 44 together form an angular scoop which propels the coffee beans directly into the discharge opening 48.

During the stirring and cooling operation the brushes 44 and 49 should be moved out of contact with the coffee beans, and to accomplish this we provide a lever or handle 50 which is rigidly secured to the brush-carrying arm 46 and is preferably bent or shaped so as to be accessible from the outside when in either of the two positions shown in Fig. 7. When the lever 50 and arm 46 are in the full-line position shown in Fig. 7 the brush rods 45 are vertical and the brushes 44 and 49 rest on the bottom 2. The brushes rotate with the shaft 22, and since rotation is in a clockwise direction the force exerted by the mass of beans will maintain the brushes in upright position so that there will be no tendency to pivot the brushes away from the bottom 2. When the lever 50 is moved to the dotted-line position in Fig. 7, the brush-carrying arm 46 pivots upon the arm 25 and carries the rods 45 and the brushes to the horizontal position out of mass of beans. In this position the arm 46 and lever 50 overbalance the brushes and prevent them from dropping back into the cooler car.

It was previously stated, and shown in Figs. 1, 2 and 6, that the outermost brush 49 hugs the side of the cooler car when in the vertical or operative position, the purpose of this being to brush the beans from the outer periphery to insure complete removal of the contents. Consequently, when the brushes are to be raised to the horizontal or inoperative position, the outermost brush 49 would strike against the side of the cooler car and prevent raising the brushes were it not that we provide means for preventing such action. This we do by providing a pin 53 screwed or otherwise fixed to the stirrer arm 25 adjacent the brush-carrying arm 46, which pin acts in a curved slot 54 in the adjacent collar 47 which is secured to the brush-carrying arm 46 and slidable on the adjacent stirrer arm 25. Consequently, when the lever 50 and brush-carrying arm 46 are swung to the dotted-line position in Fig. 7 the cam action of the pin 53 and slot 54 will cause the collar 47 and brush-carrying arm 46 to slide inwardly away from the side of the cooler car, that is, to the right as viewed in Figs. 1 and 2, or to the left as viewed in Fig. 6. The brushes 44 and 49 carried by the arm 46 are likewise moved inwardly a sufficient distance to permit the outermost brush 49 to clear the side. This sliding action, of course, starts as soon as the brushes begin to rise. When the brushes are again lowered they move outwardly under the cam action just described and come to rest in the operative position best shown in Figs. 1, 2 and 6.

The discharge opening 48 in the bottom 2 is normally closed by a trap door 55 in the form of a perforated plate hinged at 56 to the bottom 2. Beneath this door is a chute comprising an inclined bottom 57 and sides 58. The door is operated by a foldable gate consisting of plates 59 and 60 hinged together at 61, plate 59 being hinged to the door 55 at 62, and plate 60 being hinged to the frame of the car at 63. The foldable gate is controlled by a system of levers comprising an arm 64 having one end rigidly secured to the plate 60 and the other end fulcrumed at 65 to an arm 66. The opposite end of arm 66 is fulcrumed to a link 67 which is rigidly secured to a shaft 68 journaled in brackets 69 and extending outwardly to the edge of the cooler car. The shaft 68 is rotated by a foot treadle having branches 70 and 71, respectively, for opening and closing the door. In the closed or full-line position shown in Fig. 13 the door 55 lies flush with the bottom 2, presenting a smooth surface. In the open or dotted-line position shown in Fig. 13, the door 55 coincides with the inclined bottom wall 57 of the chute, with the plates 59 and 60 of the gate folded under the door. This construction permits the door 55 to be opened or closed instantly with no danger of accidental opening due to the weight of the coffee or other causes. When closed, the plates 59 and 60 form a gate beneath the door and between the sides 58 so that the passage of air through the perforated bottom 2 is not interfered with, and the gate prevents the passage of air through the side of the suction box.

From the foregoing description, the nature and advantages of the invention will be fully understood. Doing away with manual stirring of the coffee beans effects a substantial saving in labor and expense, and results in a uniformly cooled product, that is, coffee which is uniform in color, with a much improved and brighter appearance and a better flavor in the cup. The apparatus is simple in construction and operation, and the parts readily accessible for cleaning or adjustment. The cooler car may be moved toward and away from the roaster without interrupting the cooling or stirring operation, and may be emptied quickly by a simple adjustment of the rotating brushes and the discharge door, eliminating tipping of the car or other special discharging means heretofore employed.

It will be evident that various changes may be made in the details of construction and operation herein shown and described without departing from the scope of the invention as defined in the appended claims.

The invention claimed is:

1. The combination with a receptacle adapted to contain roasted coffee or other material to be cooled, of means for drawing air downwardly through said receptacle, a rotatable arm having a plurality of stirrers extending downwardly into said receptacle, said stirrers being of V-shaped cross-section with the hollow portion at the rear to create air spaces in said material for the admission of fresh air thereto, and means for rotating said arm.

2. The combination with a receptacle adapted to contain coffee or the like and having an opening in the bottom, of means for emptying said receptacle comprising a horizontal pivoted arm having a plurality of brushes adapted in one position of said arm to sweep the bottom of the receptacle and in another position of said arm to be raised above the material in the receptacle, and means for moving said arm about its pivot to raise or lower said brushes.

3. The combination with a receptacle adapted to contain coffee or the like, having an opening adjacent the outer edge of its bottom, of means for emptying said receptacle comprising a horizontal radial arm, a brush pivoted on said arm and adapted to sweep the outer edge of said bottom, means for rotating said arm, means for raising and lowering said brush about its pivot, and means for sliding said brush longitudinally on said arm.

4. The combination with a receptacle adapted to contain coffee or the like, having an opening adjacent the outer edge of its bottom, of means for emptying said receptacle comprising a horizontal radial arm, means for rotating said arm, a series of brushes pivoted on said arm and adapted when lowered to sweep substantially the entire bottom of the receptacle, means for raising said brushes about their pivot and for holding them in raised position, and a cam connection between said arm and brushes to cause said brushes to slide longitudinally of said arm when raised or lowered.

5. The combination with a receptacle adapted to contain coffee or the like, having an opening adjacent the outer edge of its bottom, of means for emptying said receptacle comprising a horizontal radial arm, means for rotating said arm, a radial series of brushes extending outwardly to the edge of the receptacle to sweep substantially the entire bottom, a support for said brushes pivoted on said arm to permit said brushes to be raised or lowered and moved longitudinally on said arm, and a slot and pin connection between said support and said arm to cause said brushes to move longitudinally when raised or lowered.

6. The combination with a receptacle for coffee or the like having an opening in its bottom, of a door for said opening hinged to said bottom and adapted when open to form a chute for discharging the material from the receptacle, a hinged gate connected to the under side of said door to hold said door tightly closed and adapted to fold beneath said door when open, and a fulcrumed lever controlling said gate to open and close said door.

7. The combination with a receptacle for coffee or the like having an opening in its bottom, of a door for said opening hinged to said bottom and adapted when closed to lie flush with said bottom and when open to form a discharge chute for the material in the receptacle, a hinged gate connected to the under side of said door to hold said door tightly closed and adapted to fold beneath said door when open, a fulcrumed lever controlling said gate to open and close said door, an operating shaft connected to said lever, and a treadle connected to said shaft to rotate it in either direction to open or close said door.

8. The combination with a cooler car having a perforated bottom, of a suction box below said bottom, a door hinged to said bottom adapted when open to form a discharge chute, a hinged gate connected to said door adapted when the door is closed to shut off the suction box from the outside air, and means for opening and closing said door.

9. The combination with a cooler car having a perforated bottom, of a suction box below said bottom, a door hinged to said bottom and adapted when open to form a chute extending outwardly through said suction box, a hinged gate connected to the under side of said door and adapted when the door is closed to form a closure for the suction box to prevent the admission of air through the side thereof and adapted to fold beneath said door when open, and means for opening and closing said door.

10. The combination with a receptacle adapted to contain a mass of roasted coffee or other material to be cooled, of means for drawing air downwardly through said receptacle, and a rotatable stirrer in said receptacle, said stirrer being of V-shaped cross-section with the hollow portion at the rear to create an air space extending into the interior of the mass of said material from the surface thereof through which air may be drawn by said drawing means into the interior of said mass without passing through layers of the material to dilute the air which has become heated by contact with the material.

11. The combination with a receptacle adapted to contain a mass of roasted coffee or other material to be cooled, of means for drawing air downwardly through said receptacle, and a rotatable stirrer in said receptacle having a trough on its rear side open to the air above the surface of the material and shaped in front to spread the material apart so as to create an air space extending into the interior of the mass of said material from the surface thereof through which air may be drawn by said drawing means into the interior of said mass without passing through layers of the material to dilute the air which has become heated by contact with the material.

12. The combination with a receptacle adapted to contain a mass of roasted coffee or other material to be cooled, of means for drawing air downwardly through said receptacle, and a rotatable stirrer in said receptacle having its forward portion shaped to spread the material apart and an opening at the rear open to the air above the surface of the coffee, a line joining the edges of such opening defining a hollow space extending forwardly of the opening so as to create an air space extending into the interior of the mass of said material from the surface thereof through which air may be drawn by said drawing means into the interior of said mass without passing through layers of the material to dilute the air which has become heated by contact with the material.

13. The combination with a vertically disposed cylindrical receptacle having a perforated bottom to receive roasted coffee or the like, of means for drawing air downwardly through said receptacle, a rotatable stirrer in said receptacle having a channel on its rear side open to the air above the surface of the material and shaped in front to spread the material apart so as to create an air space extending into the interior of the mass of said material from the surface thereof through which air may be drawn by said drawing means directly into the interior of said material to dilute the air which has become heated by contact with the material, a discharge door in the bottom of said receptacle adjacent the periphery, and means moving with said stirrer to rapidly sweep the material outwardly and through the door when the latter is opened.

Signed at New York city, in the county of New York, and State of New York, this 20th day of August, 1929.

WILLIAM G. BURNS.

Signed at New York city, in the county of New York, and State of New York, this 20th day of August, 1929.

RICHARD A. GREENE.